UNITED STATES PATENT OFFICE.

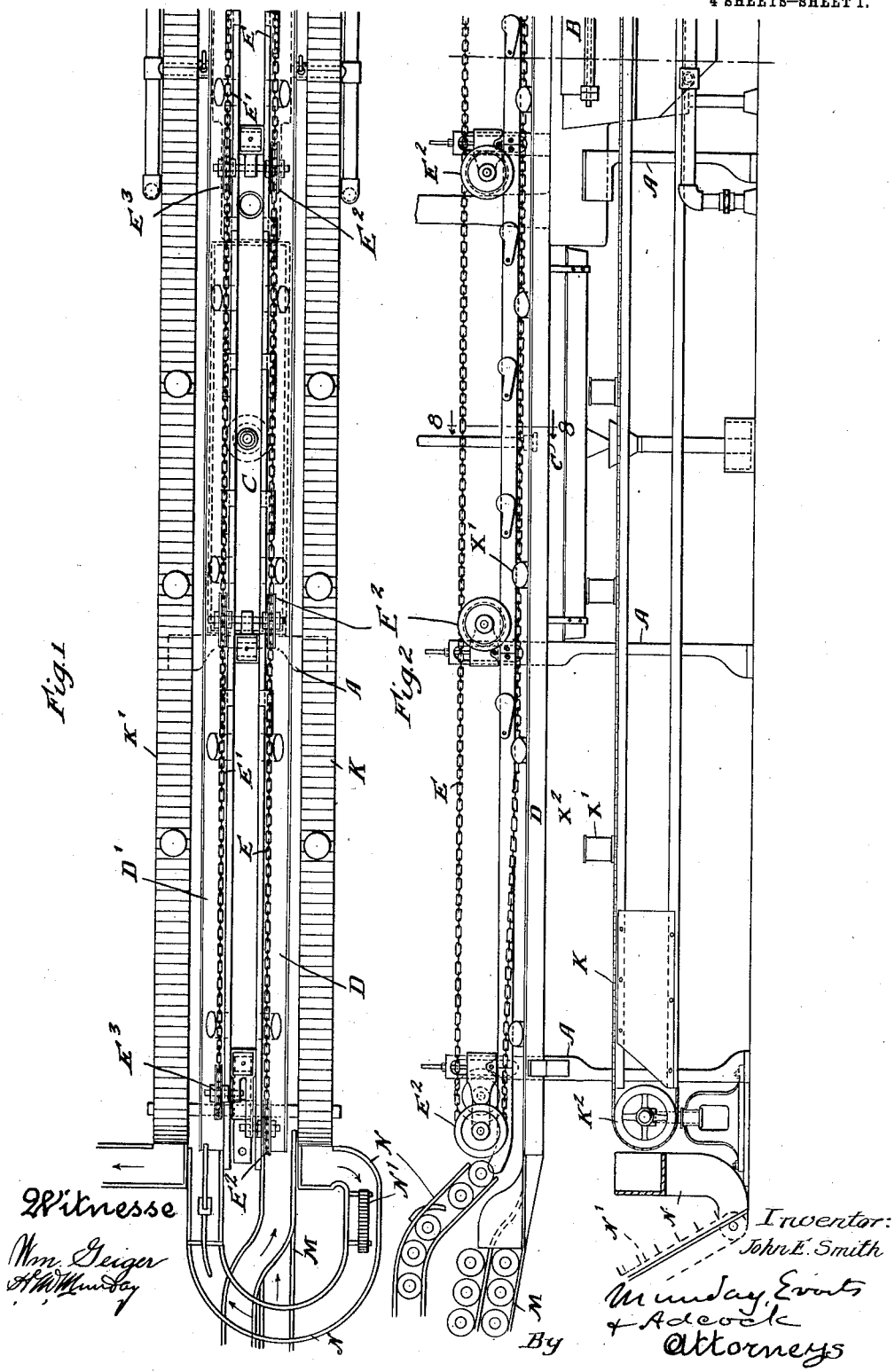

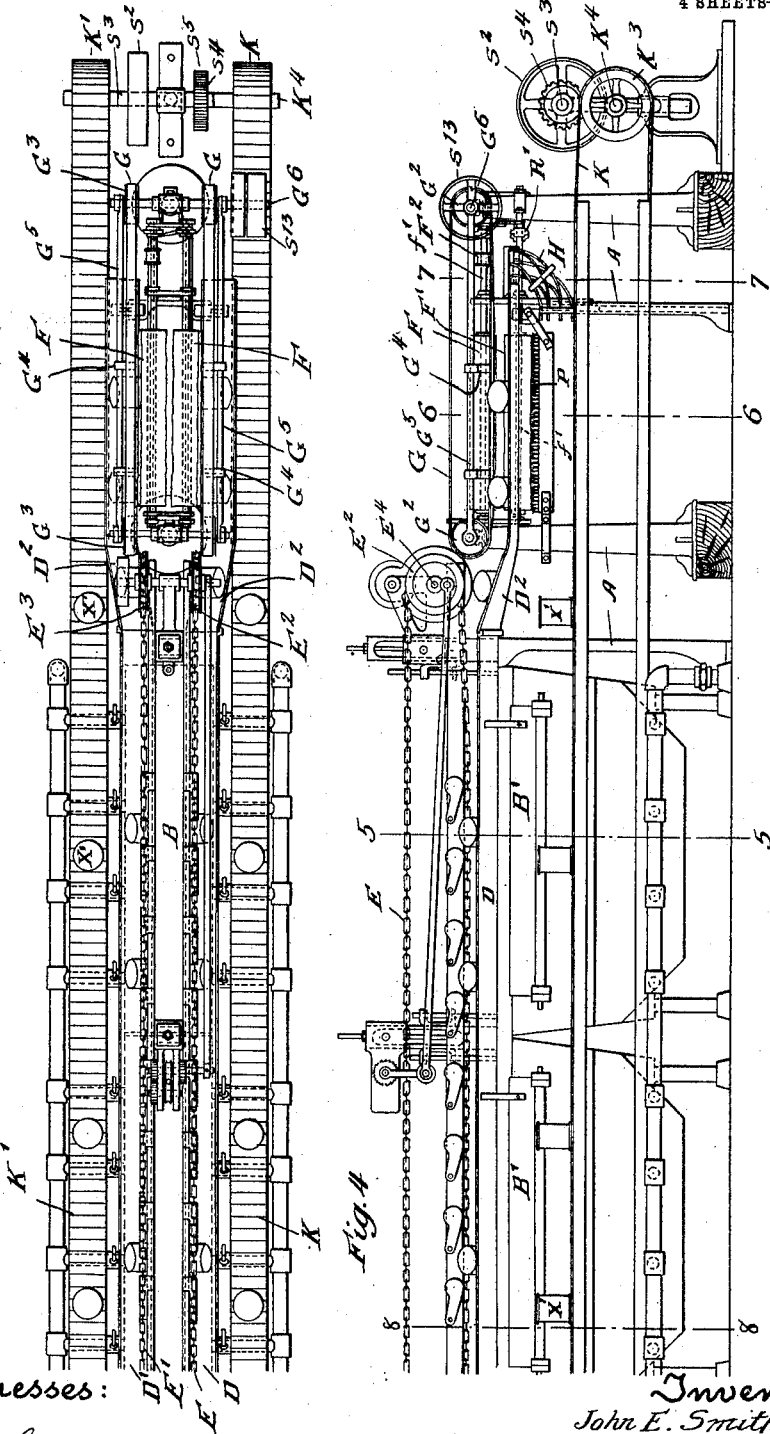

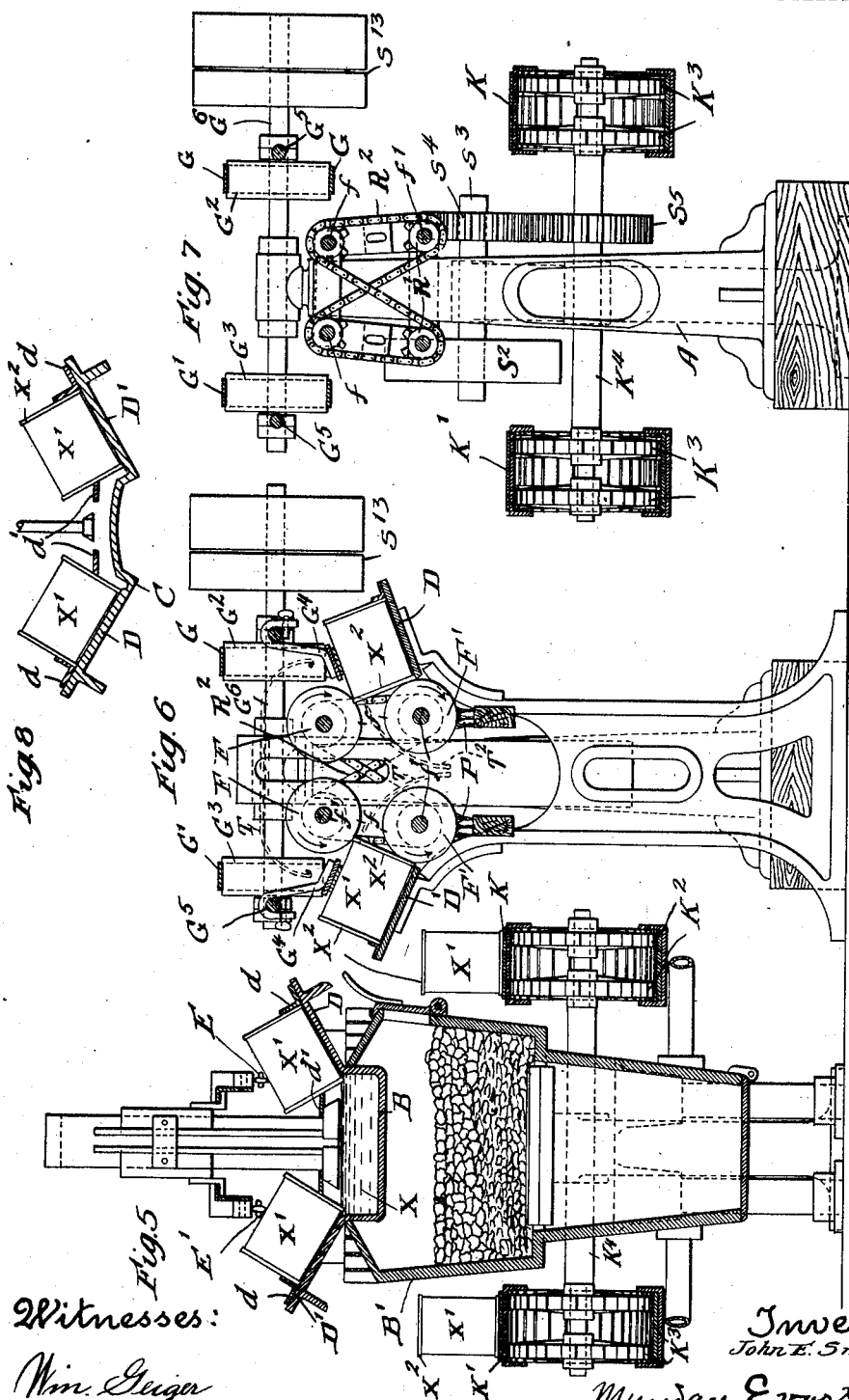

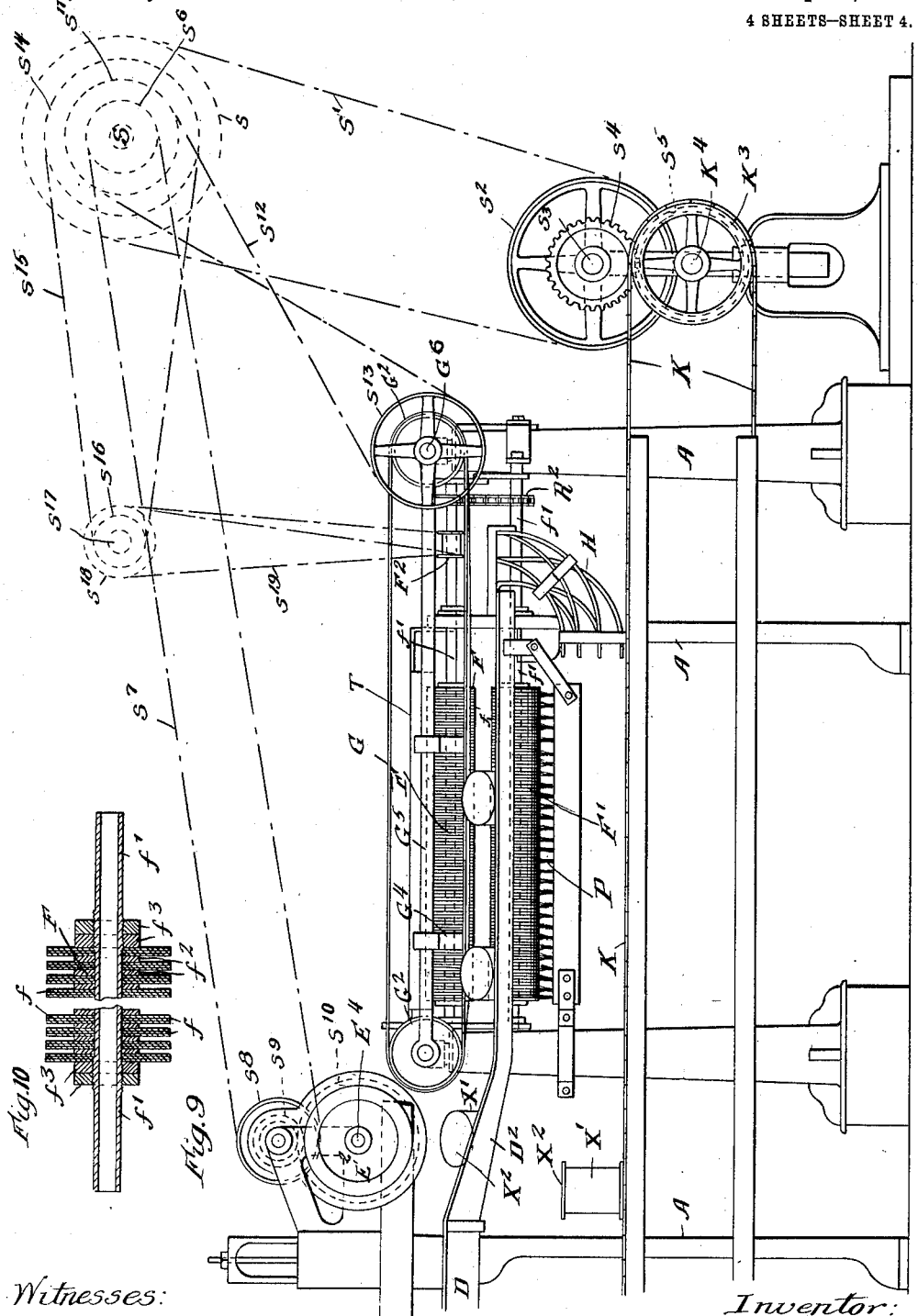

JOHN E. SMITH, OF BALTIMORE, MARYLAND, ASSIGNOR TO AMERICAN CAN COMPANY, OF NEW YORK, N. Y., A CORPORATION OF NEW JERSEY.

SOLDERING-MACHINE.

1,002,326.      Specification of Letters Patent.      Patented Sept. 5, 1911.

Application filed August 28, 1905. Serial No. 276,028.

*To all whom it may concern:*

Be it known that I, JOHN E. SMITH, a citizen of the United States, residing in Baltimore, in the State of Maryland, have invented a new and useful Improvement in Soldering-Machines, of which the following is a specification.

My invention relates to improvements in machines for soldering the end seams of round sheet metal cans by rolling the cans in an inclined position through a bath of molten solder; and more particularly to means for removing the surplus solder from the outside surface of the cans.

Heretofore the end seams of round cans have been very securely and perfectly soldered, and also very rapidly and cheaply, so far as labor cost is concerned, by the customary can end soldering machine in use and consisting, essentially, in a pair of transversely-inclined runways along which the cans are rolled, for soldering first one end and then the other end thereof, a flux bath or device and a solder bath arranged along the runways, endless chains or conveyers for rolling the cans along the runways, and can cooling belts or conveyers upon which the cans are held and conveyed in an upright position while the solder is setting, curved or twisted connecting runways or devices for turning and delivering the cans from their rolling or inclined position on the runways into an upright or vertical position on the cooling belts, and an elevator or device for elevating and delivering the cans from the cooling belt on one side of the machine to the soldering runway on the opposite side thereof after the end seam at each end of the can has been soldered preparatory to soldering the end seam at the opposite end of the can. But the soldering of the end seams of cans in this way, or by such machines, has heretofore been attended with considerable waste of solder, owing to the surplus solder coating the outside corner surface of the can which has come in contact with the molten solder as the cans roll in an inclined position through the solder bath; and no really efficient means has heretofore been devised for effectively removing this waste or surplus solder coating from the cans without danger of injury to the soldered joint, as any efficient wiping pressure or action upon the members of the seam to be united by the solder before the solder sets, is attended with danger of destroying or disturbing the perfect continuity and integrity of the joint and its hermetic tightness, and also would interfere with or require changes in the construction and operation of the other parts of the soldering mechanism.

My invention consists in the means I employ in can end soldering machines for practically accomplishing this result of effectually removing surplus solder from the outside corner surface of the cans without either interfering with the construction and operation of the other parts of the soldering mechanism, or in any way endangering the uniform perfection and hermetic tightness of the soldered joints produced by rolling the cans in an inclined position through a solder bath, and conveying the cans in an upright position and with the freshly soldered seams lowermost and in a horizontal position while the solder therein is becoming set. That is to say my invention consists, essentially, in the combination of a pair of transversely inclined can runways along which the cans may be rolled, a pair of chains or endless conveyers for rolling the cans along the runways, flux and solder baths arranged along the runways, a pair of cooling belts or conveyers upon which the cans are delivered and conveyed in an upright position while the solder in the seams of the cans is setting, two pairs of rapidly rotating long, soft cylindrical buffers, composed of a series of circular flexible textile disks strung upon the axis or shaft of the buffer, and arranged one pair longitudinally adjacent to each can runway or its extension and engaging the outside solder coated corner surfaces of the cans as they are rolled along the runways, and operating by their soft, gentle, but swift-touching buffing action against the members of the seam of each can as it rolls along, to effectually remove the molten solder coating on the outside corner surfaces of the cans before the solder hardens or becomes set, and without disturbing the members of the seam or the continuity of the solder in the seam, and curved and twisted runways or devices for turning and delivering the cans from their rolling position on the runways into an upright position on the cooling belts or conveyers after the cans have been operated upon by the buffers.

My invention further consists in the novel construction of devices and in the novel combinations of devices herein shown and described.

In the accompanying drawing, forming a part of this specification, Figure 1 is a plan view and Fig. 2 a side elevation showing one end of a can end soldering machine embodying my invention; Fig. 3 is a plan view and Fig. 4 a side elevation showing the other end of a portion of the machine; Figs. 5, 6, 7 and 8 are vertical cross sections on lines 5—5, 6—6, 7—7 and 8—8 of Fig. 4; Fig. 9 is an enlarged detail elevation, showing the rotary cylindrical buffer mechanism; and Fig. 10 is a detail sectional view showing a portion of one of the rotary cylindrical buffers.

In the drawing A represents the frame of the machine, which may be of any suitable form to give support to the various parts and devices of the machine.

B is the solder bath or vessel for containing the molten solder, $B^1$ the heater, preferably a coal-burning furnace, for melting and keeping molten the solder X in the solder vessel.

C is the flux bath or vessel for containing the acid or other flux for fluxing the seams of the cans as they are rolled along the transversely inclined can runways D $D^1$, there being one of these runways on each side of the machine. Each of the can runways D $D^1$ has an upper guide $d$ and a lower guide $d^1$ to engage the upper and lower ends of the rolling cans $X^1$.

E $E^1$ are endless chains or conveyers for rolling the cans along the runways D $D^1$, the same traveling on pulleys or sprocket wheels $E^2$ $E^3$.

F $F^1$ and F $F^1$ are rapidly revolving long, soft, cylindrical buffers, arranged longitudinally parallel with and adjacent to the can runways D $D^1$, and composed each of a series of circular, soft, flexible textile or cotton cloth disks $f$ clamped together on the buffer-shaft $f^1$, with interposed washers $f^2$ of smaller diameter, the shaft $f^1$ having clamp nuts $f^3$. The cloth disks $f$ are, preferably, about six inches in diameter, and the cylindric buffers F $F^1$ are, preferably some two or three feet in length, so that the cans rolling along the runways D or $D^1$ may make two or more revolutions while rolling in contact with the buffers. One of the rapidly revolving buffers, F, of each pair is arranged to contact with the cylindrical surface of the can at the solder coated or end seam portion thereof, and the other, $F^1$, of each pair of buffers is arranged to contact with the flat surface of the can head $X^2$, as the cans roll along the runways.

G $G^1$ are endless belts or conveyers traveling on pulleys $G^2$ $G^3$ for rolling the cans along the extended portions of the runways D $D^1$, and in contact with the buffers F $F^1$. The conveyers G $G^1$ are, preferably, belts, while the conveyers E $E^1$ are, preferably, chains. Weight arms $G^4$ hinged to a rod $G^5$ on the frame of the machine, serve to increase the grip of the belt or conveyers G $G^1$ on the cans. The runways D $D^1$ are each furnished with a downwardly-inclined portion $D^2$ to bridge the gap between the chain or rolling conveyer E or $E^1$ and the belt conveyer G or $G^1$, and thus aid in advancing the cans along after leaving the grip of the soldering conveyer until they receive the grip of the buffing conveyer.

H H are curved or twisted guideways for turning and delivering the cans from their rolling position on the runways D $D^1$ into an upright position on the cooling belts or conveyers K $K^1$, which travel on pulleys $K^2$ $K^3$, one on each side of the machine, and arranged below the runways D $D^1$.

M M are the chutes or runways for delivering the cans to the first solder runway D, and N is a looped runway furnished with an endless belt elevator $N^1$ for receiving the cans after the end seam at one end thereof has been soldered, from the cooling belt K on one side of the machine and turning the cans end for end and delivering them to the soldering runway $D^1$ on the opposite side of the machine, preparatory to soldering the opposite ends of the cans.

P P are cleaner brushes, preferably of bristles, contacting with the rotary cylindrical buffers for cleaning and freeing the same from solder. The rotary cylindrical buffers are revolved at a high or buffing speed, preferably from 600 to 700 revolutions per minute. The centrifugal action of the flexible cloth disk rapidly revolving buffers, tends to hold the cloth disks in contact with the cans as they are rolled along the runway.

The shafts $f^1$ of the buffers F $F^1$, are furnished with pulleys $R^1$, and are all geared together by an endless chain or belt $R^2$ so as to revolve in the proper direction, as indicated by the arrows in Fig. 6.

Motion is communicated from the driving shaft S to the shaft of the cooling conveyers by means of a pulley $s$ on the driving shaft, belt $s^1$, pulley $s^2$ on the shaft $s^3$, gear $s^4$ on said shaft $s^3$, and gear $s^5$ on the shaft $K^4$ of the cooling conveyer. Motion is communicated from the driving shaft to the endless conveyers E $E^1$ by which the cans are rolled along the soldering runway over the flux applying device and solder bath, by means of a pulley $s^6$ on the driving shaft, belt $s^7$, pulley $s^8$ and gears $s^9$ $s^{10}$, the latter being on the shaft $E^4$ of the conveyers E $E^1$. Motion is communicated from the driving shaft S to the endless belt conveyers G $G^1$, which roll the cans along the runways D $D^1$ in contact with the buffers by means of a pulley $s^{11}$ on the driving shaft, belts $s^{12}$ and pulley $s^{13}$ on the shaft $G^6$ of the buffing conveyers G G¹. Motion is communicated from the driving shaft S to the rotary buffers F F¹ by means of the pulley $s^{14}$ on the driving shaft, belt $s^{15}$, pulley $s^{16}$ on shaft $s^{17}$, pulley $s^{18}$ on said shaft $s^{17}$, belt $s^{19}$ and pulley F² on the shaft of one of the buffers.

The operation is as follows: The cans roll from the feed chute M onto the transversely-inclined runway D on one side of the machine along which they are rolled by the chain conveyer E, first over the fluxing bath or device and then over the solder bath, and then the cans roll down the incline D² after leaving the conveyer E into the grip of the buffing conveyer G, by which they are rolled along the extension of the runway E in contact with the rapidly revolving buffers F F¹ on this side of the machine, which serve by their buffing action to remove the surplus solder from the outside corner surface of the can which has come in contact with the molten solder in the solder bath, and then, while the solder in the seams of the cans yet remains molten, the cans are turned from their inclined or rolling position into an upright position, and in such position delivered onto the cooling conveyer K, by which they are conveyed in such upright position to the opposite end of the machine, during which time the solder in the freshly soldered seams sets and becomes hardened. The cans, with one end now soldered, are next delivered from the cooling conveyer K into the loop runway N by which the cans are elevated and turned end for end and delivered on to the other soldering runway D¹ with their soldered ends uppermost and their unsoldered ends lowermost. The cans are now rolled along the other soldering runway D¹ by the other chain conveyer E¹ again over the flux bath and solder bath, thus applying flux and solder to the remaining end seams of the can, and then the cans are rolled by the remaining belt conveyer G¹ in contact with the other pair of rapidly revolving rotary cylindrical buffers F F¹, and then the cans, with both ends soldered, and the surplus solder removed from the outside corner surfaces of both ends of the can, are discharged from the machine. The rotary cylindrical buffers F F¹ not only serve to remove the surplus solder from the outside of the cans, but also to polish such surfaces and restore the same to their original tin luster.

T is a hood or shield over the upper rotary buffers to prevent the particles of solder thrown off from the rapidly rotating buffers from being scattered over the room.

T¹ T² are curved shields for directing and deflecting downwardly the particles of solder thrown off from the lower rapidly rotating buffers.

As the endless conveyers or belts G which roll the cans along the runways in contact with the rapidly rotating buffers are flexible, they hold the cans down yieldingly against the runway and in contact with the rapidly rotating buffers, as the downward pressure of the belt on the cans, owing to the transverse inclination of the runway, tends to press or force the cans yieldingly against the buffers or down the transverse inclination of the runway toward the buffers. The axes of the lower buffers are located above the plane of the upper surface of the inclined runways upon which the cans roll, so that the lower buffers will not tend, by their engagement with the lower corners of the cans, to hold the cans at their lower ends out of contact with the lower edge of the runway.

I claim:

1. In a machine for soldering the end seams of round sheet metal cans, the combination with transversely inclined can runways, of a flux bath and a solder bath arranged along said runways, endless chain conveyers for rolling the cans along the runways over the flux and solder baths, endless belt conveyers at the end of said chain conveyers above the runways and peripherally engaging the cans for rolling the cans along the remaining portion of the runways, two pairs of rapidly revolving soft, long, cylindrical buffers between the runways, composed each of circular flexible cloth disks strung upon the shafts of the buffers with washers between the cloth disks, the buffers of each pair rotating in the same direction, two endless cooling conveyers for holding and conveying the freshly soldered and buffed cans in an upright position while the solder in the can seams is setting, two twisted guideways for turning and delivering the cans from the can runways onto the cooling conveyers in an upright position, and a loop runway for turning the cans end for end after being soldered at one end and delivering the same to the can runway for soldering the other end, said endless belt conveyers holding the cans yieldingly in contact with said buffers, said buffers being adapted to yield to each can individually in engaging the same, and the axes of the lower buffers being below the plane of said inclined runways upon which the cans roll, and means for rotating said pairs of buffers at high speed in opposite directions, substantially as specified.

2. In a machine for soldering the end seams of sheet metal cans, the combination with a can runway having a guide engaging one end of the cans, of a solder bath, a cooling belt above the runway and peripherally engaging the cans for rolling the cans along the runway, and a pair of rapidly rotating long, soft, cylindrical buffers adapted to yield individually to each can in engaging the same, and composed of a series of circular flexible cloth disks arranged longitudinally adjacent and parallel to the runway and tangentially engaging the solder-coated outside surface of the cans as they are rolled along the runway to remove the surplus solder from such surface before the solder sets and before the cans are delivered to the cooling conveyer, said endless conveyer for rolling the cans along the runway adjacent to the buffer holding the cans yieldingly in contact with the buffers, said buffers being spaced apart and simultaneously engaging the cans at diametrically opposite points, one of said buffers engaging the circumferential surface of the can head flange and the other engaging the end surface of the can head, and the axis of the lower buffer being above the plane of the runway, and means for rotating said buffers at high speed in the same direction, substantially as specified.

3. In a machine for soldering the end seams of round cans, the combination with a can runway having a guide engaging one end of the cans, and means above the runways and peripherally engaging the cans for rolling the cans along the runway, a solder bath, a pair of rapidly rotating soft, flexible, cylindrical buffers adapted to yield individually to each can and tangentially engaging the outside solder-coated surfaces of the cans as they roll along the runway, said means for rolling the cans along the runway adjacent to the buffers holding the cans yieldingly in contact with the buffers, and a cooling belt, said buffers being spaced apart and simultaneously engaging the cans at diametrically opposite points, one of said buffers engaging the circumferential surface of the can head flange and the other engaging the end surface of the can head, and the axis of the lower buffer being above the plane of the runway, and means for rotating said buffers at high speed in the same direction, substantially as specified.

4. In a machine for soldering the end seams of round cans, the combination with a can runway having a guide engaging one end of the cans, and means above the runway and peripherally engaging the cans for rolling the cans along the runway, a solder bath, a pair of rapidly rotating soft, flexible, cylindrical buffers adapted to yield individually to each can and tangentially engaging the outside solder-coated surfaces of the cans as they roll along the runway, a cooling belt, and means for delivering the cans from the can runway to the cooling conveyer in an upright position, said means for rolling the cans along the runway adjacent to the buffers holding the cans in contact with the buffers, said buffers being spaced apart and simultaneously engaging the can at diametrically opposite points, one of said buffers engaging the circumferential surface of the can head flange and the other engaging the end surface of the can head, and the axis of the lower buffer being above the plane of the runway, and means for rotating said buffers at high speed in the same direction, substantially as specified.

5. In a machine for soldering the end seams of round cans, the combination with two transversely-inclined can runways, of a solder bath, means above the runways and peripherally engaging the cans for rolling the cans along the runways, two pairs of rapidly rotating soft, flexible, cylindrical buffers between the runways, each composed of a series of thin, circular, textile disks, the buffers of each pair rotating in the same direction, and two cooling conveyers, said means for rolling the cans along the runway adjacent to the buffers holding the cans yieldingly in contact with the buffers, and means for rotating said pairs of buffers at high speed in opposite directions, substantially as specified.

6. In a machine for soldering the end seams of round cans, the combination with two transversely-inclined can runways, of a solder bath, means above the runways and peripherally engaging the cans for rolling the cans along the runways, two pairs of rapidly rotating, soft, flexible, cylindrical buffers between the runways, each composed of thin, circular, textile disks, the buffers of each pair rotating in the same direction, two cooling conveyers, and a loop track and elevator for delivering the cans from the cooling belt on one side of the machine to the runway on the other side of the machine, said buffers being adapted to yield to each can individually in engaging the same, and the axes of the lower buffers being below the plane of said inclined runways upon which the cans roll, and means for rotating said pairs of buffers at high speed in opposite directions, substantially as specified.

7. In a machine for soldering the end seams of round cans, the combination with two transversely-inclined can runways, of a solder bath, means above the runways and peripherally engaging the cans for rolling the cans along the runways, two pairs of rapidly rotating soft, flexible, cylindrical buffers between the runways, each composed of a series of thin, circular, textile disks, the buffers of each pair rotating in the same direction, two cooling conveyers, and means for delivering the cans from the runways to the cooling conveyers in an upright position, said means for rolling the cans along the runway adjacent to the buffers holding the cans yieldingly in contact with the buffers, said buffers being adapted to yield to each can individually in engaging the same, and the axes of the lower buffers being below the plane of said inclined runways upon which the cans roll, and means for rotating said pairs of buffers at high speed in opposite directions, substantially as specified.

8. The combination with a can runway, of a solder bath, an endless conveyer above the runway and peripherally engaging the cans for rolling the cans along the runway, having a guide engaging one end of the cans, a rapidly rotating soft, cylindrical buffer parallel to the runway and tangentially engaging the rolling cans, and a brush for removing particles of solder from the buffer, said endless conveyer holding the cans yieldingly in contact with said buffer, said buffer being adapted to yield individually to each can, and the axis of said buffer being above the plane of the runway, and means for rotating said buffer at high speed, substantially as specified.

9. In a machine for soldering the end seams of round cans, the combination with a can runway having a guide engaging one end of the cans, of a solder bath, a rapidly rotating, soft, cylindrical buffer tangentially engaging the rolling cans, composed of flexible, textile disks, an endless conveyer above the runway and peripherally engaging the cans for rolling the cans along the runway over the solder bath, a second endless conveyer for rolling the cans along the runway adjacent to the buffer and holding the cans yieldingly in contact with said buffer, said buffer being adapted to yield individually to each can, and the axis of said buffer being above the plane of the runway, and means for rotating said buffer at high speed, substantially as specified.

10. In a machine for soldering the end seams of round cans, the combination with a can runway having a guide engaging one end of the cans, of a solder bath, a longitudinally arranged rotating buffer parallel to the runway and tangentially engaging the rolling cans, an endless belt above the runway and peripherally engaging the cans for rolling the cans along the runway in engagement with the buffer, and holding the cans yieldingly in contact with said buffer, and arms bearing against the belt to increase its grip on the cans, said buffer being adapted to yield individually to each can, and the axis of said buffer being above the plane of the runway, and means for rotating said buffer at high speed, substantially as specified.

11. In a machine for soldering the end seams of round cans, the combination with a can runway, having a guide engaging one end of the cans, of a solder bath, a rapidly rotating cylindrical buffer parallel to said runway and tangentially engaging the solder coated outside surface of the cans before the solder therein sets or hardens, and a cooling conveyer for holding and conveying the cans in an upright position while the solder sets, and means for rolling the cans along the runway and holding them yieldingly in contact with the buffer, said buffer being adapted to yield individually to each can, and the axis of said buffer being above the plane of the runway, and means for rotating said buffer at high speed, substantially as specified.

12. In a machine for soldering the end seams of round cans, the combination with a can runway having a guide engaging one end of the cans, of a solder bath, a rapidly rotating cylindrical buffer parallel to said runway and tangentially engaging the solder coated outside surface of the cans before the solder thereon sets or hardens, a cooling conveyer for holding and conveying the cans in an upright position while the solder sets, and means for turning the cans from an inclined position to an upright position and delivering them onto the cooling conveyer, and means for rolling the cans along the runway and holding them yieldingly in contact with the buffer, said buffer being adapted to yield individually to each can, and the axis of said buffer being above the plane of the runway, and means for rotating said buffer at high speed, substantially as specified.

13. In a machine for soldering the end seams of round cans, the combination with a solder bath, of two transversely inclined can runways, one on either side of the machine, two cooling conveyers below the runways, and two pairs of rapidly rotating soft cylindrical buffers between the runways composed of flexible textile disks parallel to the runways, the buffers of each pair rotating in the same direction, and means for rolling the cans along the runways and holding them yieldingly in contact with the buffers, said buffers being adapted to yield to each can individually in engaging the same, and the axes of the lower buffers being below the plane of said inclined runways upon which the cans roll, and means for rotating said pairs of buffers at high speed in opposite directions, substantially as specified.

14. In a machine for soldering the end seams of round cans, the combination with a solder bath, of two transversely inclined can runways, one on either side of the machine, two cooling conveyers below the runways, two pairs of rapidly rotating soft cylindrical buffers between the runways composed of flexible textile disks parallel to the runways, and means for turning the cans in an upright position and delivering them to the cooling conveyers as they leave the runways, the buffers of each pair rotating in the same direction, and means for rotating the cans along the runways and holding them yieldingly in contact with the buffers, said buffers being adapted to yield to each can individually in engaging the same, and the axes of the lower buffers being below the plane of said inclined runways upon which the cans roll, and means for rotating said pairs of buffers at high speed in opposite directions, substantially as specified.

15. In a machine for soldering the end seams of round cans, the combination with a solder bath, of two transversely inclined can runways, one on either side of the machine, two cooling conveyers below the runways, two pairs of rapidly rotating soft cylindrical buffers between the runways, composed of flexible textile disks parallel to the runways, the buffers of each pair rotating in the same direction, means for turning the cans in an upright position and delivering them to the cooling conveyers as they leave the runways, and a loop runway and elevator for turning the cans end for end and delivering them from the cooling belt on one side of the machine to the runway on the other, and means for rolling the cans along the runways and holding them yieldingly in contact with the buffers, said buffers being adapted to yield to each can individually in engaging the same, and the axes of the lower buffers being below the plane of said inclined runways upon which the cans roll, and means for rotating said pairs of buffers at high speed in opposite directions, substantially as specified.

16. In a machine for soldering the end seams of round cans, the combination with a solder bath, of a can runway having a guide engaging one end of the cans, means for rolling the cans along the runway, a can cooling conveyer for conveying the freshly soldered cans in an upright position while the solder in the can seam is setting or cooling, and a long, cylindrical buffer parallel to the can runway and interposed along the path of the cans between the solder bath and can cooling conveyer and tangentially engaging the rolling cans, said means for rolling the cans along the runway adjacent to the buffer holding the cans yieldingly in contact with the buffer, said buffer being adapted to yield individually to each can, and the axis of said buffer being above the plane of the runway, and means for rotating said buffer at high speed, substantially as specified.

17. In a machine for soldering the end seams of round cans, the combination with a can runway having a guide engaging one end of the cans, means for applying molten solder to the end seams of the cans as they roll along the runway, a rotating cylindrical buffer parallel to the can runway and tangentially engaging the rolling cans and engaging the solder-coated surface of the cans before the solder thereon sets or hardens, and a can cooling conveyer for holding and conveying the cans in an upright position while the solder sets after being acted on by said buffer, and means for rolling the cans along the runway and holding them yieldingly in contact with the buffer, said buffer being adapted to yield individually to each can, and the axis of said buffer being above the plane of the runway, and means for rotating said buffer at high speed, substantially as specified.

18. In a machine for soldering the end seams of round cans, the combination with a can runway, having a guide engaging one end of the cans, means for applying molten solder to the end seams of the cans as they roll along the runway, a rotating cylindrical buffer parallel to the can runway and tangentially engaging the rolling cans and engaging the solder-coated surface of the cans before the solder thereon sets or hardens, a can cooling conveyer for holding and conveying the cans in an upright position while the solder sets after being acted on by said buffer, and means for turning the cans from their rolling position on said runway and delivering them onto said cooling conveyer in an upright position, and means for rolling the cans along the runway and holding them yieldingly in contact with the buffer, said buffer being adapted to yield individually to each can, and the axis of said buffer being above the plane of the runway, and means for rotating said buffer at high speed, substantially as specified.

19. In a machine for soldering the end seams of round cans, the combination with a solder bath, of two oppositely inclined runways, endless conveyers above the runways for rolling the cans along the same, and two rotary buffers composed of circular cloth disks and spaced apart and arranged between the inner edges of said runways and curved shields over said buffers, and means for rotating said buffers at high speed in the same direction, substantially as specified.

20. In a machine for soldering the end seams of round cans, the combination of oppositely and transversely inclined runways, endless flexible belts for rolling the cans along said runways, rotary buffers spaced apart and composed of circular cloth disks and arranged with their axes between the lower edges of said runways and means for transversely inclining the portion of said belts engaging the cans to correspond to the inclination of the runways, and means for rotating said buffers at high speed in the same direction, substantially as specified.

JNO. E. SMITH.

Witnesses:
T. BAYARD WILLIAMS,
FREDERICK WILKINS.

Copies of this patent may be obtained for five cents each, by addressing the "Commissioner of Patents, Washington, D. C."